United States Patent
Kessler et al.

(10) Patent No.: US 12,251,067 B2
(45) Date of Patent: Mar. 18, 2025

(54) METHOD FOR REMOTELY CONTROLLING A CLEANING CYCLE OF A HOUSEHOLD APPLIANCE

(71) Applicant: Henkel AG & Co. KGaA, Duesseldorf (DE)

(72) Inventors: Arnd Kessler, Monheim am Rheim (DE); Thomas Juckel, Monheim (DE); Annette Dietrich, Erkrath (DE); Robert Ruiz Hernandez, Duesseldorf (DE)

(73) Assignee: HENKEL AG & CO. KGAA, Duesseldorf, NY (US)

( * ) Notice: Subject to any disclaimer, the term of this patent is extended or adjusted under 35 U.S.C. 154(b) by 399 days.

(21) Appl. No.: 17/786,507

(22) PCT Filed: Jul. 23, 2020

(86) PCT No.: PCT/EP2020/070739
§ 371 (c)(1),
(2) Date: Jun. 16, 2022

(87) PCT Pub. No.: WO2021/121679
PCT Pub. Date: Jun. 24, 2021

(65) Prior Publication Data
US 2023/0034509 A1    Feb. 2, 2023

(30) Foreign Application Priority Data

Dec. 19, 2019    (EP) ..................................... 19217843

(51) Int. Cl.
*A47L 15/00*    (2006.01)
*D06F 33/37*    (2020.01)
(Continued)

(52) U.S. Cl.
CPC ....... *A47L 15/0063* (2013.01); *A47L 15/0055* (2013.01); *G08C 17/02* (2013.01);
(Continued)

(58) Field of Classification Search
CPC ............. A47L 15/0063; A47L 15/0055; A47L 2401/34; A47L 2501/07; D06F 33/37;
(Continued)

(56) References Cited

U.S. PATENT DOCUMENTS 11,230,805 B2 *  1/2022  Kessler ................... D06F 33/30
11,356,938 B2 *  6/2022  Ogawa ................... H04W 48/16
12,031,261 B2 *  7/2024  Kessler ................... D06F 33/37

FOREIGN PATENT DOCUMENTS

DE    102016203095 A1    8/2017
DE    102018200214 A1    7/2019
(Continued)

*Primary Examiner* — John A Tweel, Jr.
(74) *Attorney, Agent, or Firm* — Lorenz & Kopf, LLP

(57) ABSTRACT

A method and system remotely controlling a cleaning cycle of a household appliance using transmission of wireless signals is provided. Signals are transmitted between a mobile dispensing device arranged in the household appliance and an electronic device. The method determines the strength of a signal received by the mobile dispensing device. The determined strength is compared to a threshold value. If the determined strength is above the threshold value transmission of wireless signals from the mobile dispensing device to the electronic device is enabled. If the determined strength is below the threshold value transmission of signals from the mobile dispensing device to the electronic device is disabled. When transmission of signals is enabled, a status wireless signal comprising status information about the cleaning cycle is sent to the electronic device.

15 Claims, 3 Drawing Sheets

(51) Int. Cl.
*D06F 34/14* (2020.01)
*D06F 103/00* (2020.01)
*G08C 17/02* (2006.01)
*H04W 8/00* (2009.01)
*D06F 34/05* (2020.01)
*D06F 101/00* (2020.01)
*D06F 105/42* (2020.01)
*G16Y 40/35* (2020.01)

(52) U.S. Cl.
CPC ......... *H04W 8/005* (2013.01); *A47L 2301/08* (2013.01); *A47L 2401/34* (2013.01); *A47L 2501/07* (2013.01); *D06F 33/37* (2020.02); *D06F 34/05* (2020.02); *D06F 34/14* (2020.02); *D06F 2101/00* (2020.02); *D06F 2103/00* (2020.02); *D06F 2105/42* (2020.02); *G16Y 40/35* (2020.01)

(58) Field of Classification Search
CPC ... D06F 34/05; D06F 2101/00; D06F 2103/00
See application file for complete search history.

(56) References Cited

FOREIGN PATENT DOCUMENTS

| | | |
|---|---|---|
| EP | 2706138 A1 | 3/2014 |
| FR | 2916111 A1 | 11/2008 |
| WO | 2011110246 A1 | 9/2011 |
| WO | 2012177796 A1 | 12/2012 |
| WO | 2019121295 A1 | 6/2019 |

\* cited by examiner

METHOD FOR REMOTELY CONTROLLING A CLEANING CYCLE OF A HOUSEHOLD APPLIANCE

CROSS-REFERENCE TO RELATED APPLICATION

This application is a U.S. National-Stage entry under 35 U.S.C. § 371 based on International Application No. PCT/EP2020/070739, filed Jul. 23, 2020, which was published under PCT Article 21 (2) and which claims priority to European Application No. 19217843.2, filed Dec. 19, 2019, which are all hereby incorporated in their entirety by reference.

TECHNICAL FIELD

The present disclosure relates to the field of monitoring and controlling of a cleaning cycle in a household appliance when a mobile dispensing device is arranged in the housing of the household appliance. The present disclosure more particularly addresses the issue of providing insight into the live status of the cleaning status and allowing changes to the program run by the mobile dispensing device and/or the household appliance.

BACKGROUND

Cleaning cycles in household appliances are typically run according to a prerecorded program stored in or transferred to the household appliance. The selection of the program is generally made by the user. This approach to running a cleaning cycle lacks flexibility and does not guarantee achievement of the best cleaning result, as the selected program may not be adapted to the intensity of cleaning required to remove all stains from the items placed in the household appliance.

In addition to lacking flexibility in operability, little information is provided to the user on the status of the cleaning cycle while it is run by the household appliance, and knowledge of what is currently happening in the household appliance can only occur indirectly by standing next to the appliance or looking through a glass window when such a window is available.

Further flexibility in operating the cleaning cycle run by a household appliance can be achieved by placing a mobile dispensing device inside the housing of the household appliance. The mobile dispensing device enables a finer control of the timing of cleaning agents included in the mobile dispensing device as well as the amount and nature of the cleaning agents that are dispensed. Mobile dispensing devices offering such control on the cleaning cycle run by a household appliance are for example described in document WO2011110246 A1, which describes a dosing device adapted to dispense cleaning agents during a cleaning cycle of a dishwasher and document WO2019121295 A1 which describes a dosing device adapted to dispense cleaning agents during a cleaning cycle of a washing machine.

Despite offering a better flexibility and enabling better cleaning strategies to be applied during the cleaning cycle run by the household appliance, the use of mobile dosing devices in household appliances still operates according to a prerecorded program stored in the dosing device. Decisions regarding possible changes to the dosing strategy may be taken by the dosing device at the beginning of the cleaning cycle and the current status of the cleaning cycle run by the household appliance is not communicated to the user in real time, but rather at the end of each cleaning cycle.

Despite the above solutions enabling a user a finer control on the parameters of the cleaning cycle run by the household appliance, the user remains unaware of the real-time status of the program run by the household appliance and/or the mobile dispensing device.

An underlying problem rendering such a deeper insight into what is happening in the household appliance during the cleaning cycle is the attenuation of wireless signals by the environment created by the household appliance and likely interferences with other devices in the area in which the appliances are typically located. A real-time transmission of signals providing information on the status of the cleaning cycle, as well as exchange of wireless data between the mobile dosing device and nodes, or sensors located in or around the household appliance is generally considered as inefficient.

A method and system controlling a cleaning cycle of a household appliance during the cleaning cycle is sought.

BRIEF SUMMARY

To address the above need, the present disclosure provides a method for remotely controlling a cleaning cycle of a household appliance using transmission of wireless signals, the wireless signals being transmitted between a mobile dispensing device configured to be arranged in a housing of the household appliance and an external electronic device located outside of the household appliance, the method comprising:
  determining a value of a strength of a wireless signal received by the mobile dispensing device;
  comparing the determined value of the strength of the wireless signal received by the mobile dispensing device to a threshold signal strength value;
  enabling transmission of wireless signals from the mobile dispensing device to the external electronic device when the determined value of the strength of the wireless signal received by the mobile dispensing device is above the threshold signal strength value;
  sending a status wireless signal comprising status information about the cleaning cycle, the status wireless signal being sent from the mobile dispensing device to the external electronic device when transmission of wireless signals is enabled during the cleaning cycle;
  disabling transmission of wireless signals from the mobile dispensing device to the external electronic device when the determined value of the strength of the wireless signal received by the mobile dispensing device is below the threshold signal strength value.

Prior art methods for controlling a cleaning cycle operate on the basis of local information, collected by the household appliance or sensors on the mobile dispensing device, and prior to starting the cleaning cycle.

The present disclosure provides a deeper insight into the current cleaning cycle live, by transmitting reports about the ongoing status information of the cleaning cycle at opportune times. Indeed, the design of household appliances generally hinders transfer of wireless signals, in particular radio communication signals. The present disclosure sets criteria to initiate or disable transfer of status information to avoid wasting battery power in the mobile dispensing device during the cleaning cycle.

Information provided by the status report can be used to instruct the mobile dispensing device to adapt the dosing strategy to new desires of a user or can be used to automatically generate new dosing strategies for the mobile dispensing device or new parameters for the household appliance.

Examples of external electronic devices may include access nodes for transmitting wireless signals, a mobile phone, a tablet, a smart watch, a computer, a server.

The "strength of a wireless signal" is typically measured as the power of the electromagnetic radiation that is received within a certain frequency band or across a plurality of frequency bands. In the context of the present disclosure, one advantageous criterion to define the measurement of the strength of a wireless signal is the measurement of the power of received signals across all frequency bands used for exchanging data between the mobile dispensing device and nodes in a network or the external electronic device.

It is to be further noted that the wireless signals transmitted between the mobile dispensing device and the external electronic device may be transmitted via a direct wireless communication or via an indirect transmission for example via the node of a wireless network or any other access node. The access node itself may be part of the household appliance, located somewhere outside of the household appliance.

According to an embodiment, the value of the strength of the wireless signal is determined by repeatedly obtaining a value of an attenuation of signals received by the mobile dispensing device.

Obtaining the value of the attenuation of signals received by the mobile dispensing device is equivalent to determining the value of the strength of wireless signals received by the mobile dispensing device. It can for example be done by measuring the RSSI (Received Signal Strength Indicator) value, in particular in the event that the signal is received from an access node of a network. It can also be done by measuring the amplitude of the electrical current generated in the mobile dispensing device by the reception of the signal or the amplitude of the electromagnetic radiation received by an antenna of the mobile dispensing device.

The frequency at which the signal strength is measured can vary. For example, a measurement can be taken every minute, every ten minutes or every ten seconds.

Triggering of a measurement of the signal strength can also occur based on the value of the previous signal strength that was measured. For example, if the last value or the two to ten values that were measured were all representative of a strong signal which enables fast data transmission with low loss of battery power, then the next measurement of signal strength can occur at least one to ten minutes later. If a drop in signal strength is observed during a wireless transmission of signals between the mobile dispensing device and the external electronic device, then the measurement of signal strength can occur more frequently, at least from once per minute to once every five minutes. It is possible to apply a different logic to the timing of measurements of signal strength, in particular the opposite logic according to which the frequency of the measurement is higher when signal strength is high, and the frequency of the measurement is lower when signal strength is low.

According to an embodiment, the method may further comprise:
  determining a change in the value of the strength of the wireless signal received by the mobile dispensing device over time;
  determining a status of the cleaning cycle run by the household appliance based on the determined change.

For example, due to changes in humidity, water temperature or activation of rotating metallic inside household appliances such as dishwashers and washing machines during a cleaning cycle, corresponding variations in signal strength intensity can be observed. The changes to the values of signal strength due to the operation of the household appliance can be used as a means to determine which step of the cleaning cycle is being run by the household appliance. This information can be used either to adapt the dosing strategy or can be stored and/or communicated to the external electronic device in order to give a live status update.

The method may further comprise:
  determining a pattern in values of the strength of the wireless signal received by the mobile dispensing device as a function time;
  identifying contributions to the determined pattern external to the cleaning cycle run by the household appliance.

The environment in which the household appliance is located may comprise elements that hinder the transmission of wireless signals. Interferences, noise or absorption of wireless signals may occur due to the presence of other appliances, of a closed space such as walls in a basement or due to an unfortunate placement of the mobile dispensing device inside the housing of the household appliance.

These effects on the wireless signal transmission can be identified as unusual patterns in the values of the strength of wireless signals received by the mobile dispensing device.

According to an embodiment, the identification of contributions to the determined pattern external to the cleaning cycle run by the household appliance is implemented using one among:
  comparison of the determined pattern to patterns stored from previous cleaning cycles run by the household appliance;
  input from a user.

Input from a user can for example be collected as responses to questions about the room in which the household appliance is located, the presence of other appliances around the household appliance, the localization of the user and the household appliance.

According to an embodiment, the method may further comprise:
  recording determined values of the strength of the wireless signal received by the mobile dispensing device;
  generating a report for the external electronic device if the recorded values comprise at least one value that is below the signal strength threshold value.

The report that is generated is sent to the external electronic device and can also form another basis for outputting recommendations on how to avoid further significant drops in signal strength in future cleaning cycles. The report may provide a description of the duration during which the recorded values were below the signal strength threshold value, the number of times that the strength of the wireless signal went below the signal strength threshold value. These figures can also include a time stamp which helps identify the cause of this event, for example if it can be related to an interference or loss of signal due to an excessive distance between the external electronic device and the mobile dispensing device.

According to an embodiment, the method may further comprise:
  outputting a recommendation for one among:
    a change in a position of the mobile dispensing device inside the household appliance;
    a change in a position of a source of wireless signal interferences;

a switching off of the source of wireless signal interferences;

installation of a signal amplifier;

a change in the position of an access node used to relay information from the mobile dispensing device to the external electronic device.

The source of wireless signal interference can typically be another electronic device such as an appliance, in a kitchen, a basement or living room for example.

According to an embodiment, the method may further comprise:

modifying a program to dispense cleaning agents from the mobile dispensing device into the housing during the cleaning cycle based on information provided in wireless signals received by the mobile dispensing device, the cleaning agents being included in the mobile dispensing device;

dispensing the cleaning agents based on the modified program.

According to an embodiment, an internal electronic device capable of establishing a communication with the mobile dispensing device being located inside the household appliance, the method may further comprise:

receiving, at the mobile dispensing device, an internal wireless signal from the internal electronic device providing information on a parameter of the cleaning cycle run by the household appliance;

determining a change to a program to dispense cleaning agents from the mobile dispensing device into the housing during the cleaning cycle based on the received internal wireless signal.

Internal electronic devices located inside the household appliance may for example include an access node for forwarding wireless signals, a sensor, an electronic device that is part of the household appliance. It is further to be noted that the mobile dispensing device is capable of establishing wireless communication with more than one electronic device. In particular one or more electronic devices can be located inside the household appliance, and one or more electronic devices can be located outside the household appliance.

According to an embodiment, the method may further comprise:

sending an instruction to change a program to dispense cleaning agents from the mobile dispensing device into the housing, the instruction being sent as a wireless signal from the external electronic device to the mobile dispensing device during the cleaning cycle.

The instruction can in particular be generated based on the information provided in the status wireless signal sent from the mobile dispensing device to the external electronic device. The instruction can either be automatically generated or be generated based on further instructions provided by a user via the external electronic device.

According to an embodiment, the method may further comprise:

defining at least two wireless signal strength value ranges for signal strength values above the threshold value, the two wireless signal strength value ranges comprising a first signal strength value range and a second signal strength value range, values of strengths of signals belonging to the first signal strength value range being higher than values of strengths of signals belonging to the second signal strength value range;

allowing unrestricted transmission of data upon determining that the strength of the wireless signal received by the mobile dispensing device belongs to the first signal strength value range; and restricting an amount of data that is transmitted upon determining that the strength of the wireless signal received by the mobile dispensing device belongs to the second signal strength value range.

In wireless communications, transfer of data is generally linked to the strength of the signals that are exchanged. When the signal that is transmitted reaches a certain level of attenuation, the speed of the transmission is lowered. Such a regulation in the way packets of data are transferred occurs automatically in wireless communications. In order to avoid putting too much strain on the battery of the mobile dispensing device, it makes sense to adapt the nature of the data that is being transmitted based on the value of the strength of the wireless signal that is received, which is a measure of the attenuation of the signals that can be transmitted. Creating several signal strength value ranges and restricting the amount of data that can be transferred for each signal strength value range limits the strain put on the battery of the mobile dispensing device.

According to an embodiment, the wireless signal received by the mobile dispensing device may be sent from an access node.

Access nodes can for example be WLAN access nodes part of a network. Known procedures for estimating signal attenuation, such as measurement of the RSSI value (Received Signal Strength Indicator) can be used when receiving signals from an access node.

According to an embodiment the access node is part of one among: the external electronic device and a wireless communication node part of a wireless network.

The present disclosure also pertains to a system for remotely controlling a cleaning cycle of a household appliance, the system comprising:

a mobile dispensing device configured to be arranged in a housing of the household appliance;

an external electronic device located outside of the household appliance;

at least one data processing device arranged in the mobile dispensing device and configured to:

determine a value of a strength of a wireless signal received by the mobile dispensing device;

compare the determined value of the strength of the wireless signal received by the mobile dispensing device to a threshold signal strength value;

enable transmission of wireless signals from the mobile dispensing device to the external electronic device when the determined value of the strength of the wireless signal received by the mobile dispensing device is above the threshold signal strength value;

send a status wireless signal comprising status information about the cleaning cycle, the status wireless signal being sent from the mobile dispensing device to the external electronic device when transmission of wireless signals is enabled during the cleaning cycle;

disable transmission of wireless signals from the mobile dispensing device to the external electronic device when the determined value of the strength of the wireless signal received by the mobile dispensing device is below the threshold signal strength value.

The present disclosure also pertains to a computer program product comprising instructions for executing a method for remotely controlling a cleaning cycle of a household appliance using transmission of wireless signals, the wireless signals being transmitted between a mobile dispensing device configured to be arranged in a housing of the household appliance and an external electronic device, the method comprising:
- determining a value of a strength of a wireless signal received by the mobile dispensing device;
- comparing the determined value of the strength of the wireless signal received by the mobile dispensing device to a threshold signal strength value;
- enable transmission of wireless signals from the mobile dispensing device to the external electronic device when the determined value of the strength of the wireless signal received by the mobile dispensing device is above the threshold signal strength value;
- trigger emission of a status wireless signal comprising status information about the cleaning cycle, the status wireless signal being sent from the mobile dispensing device to the external electronic device when transmission of wireless signals is enabled during the cleaning cycle;
- disable transmission of wireless signals from the mobile dispensing device to the external electronic device when the determined value of the strength of the wireless signal received by the mobile dispensing device is below the threshold signal strength value.

In other words, the present disclosure concerns a non-transitory computer readable storage medium having stored thereon a computer program comprising instructions for execution of the method described above.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

The present disclosure enables users to obtain a live insight into a current cleaning cycle in a household appliance without requiring the user to stand in front of the household appliance. In particular, the present disclosure applies to the customizable control of cleaning cycles using mobile dispensing devices that are configured to be placed into the housing of household appliances such as dishwashers or washing machines.

It is usually acknowledged that wireless communication between a household appliance and an external electronic device such as a computer, mobile phone, tablet, smart watch or server can occur insofar as the wireless communication elements of the household appliance are not located in the housing of the household appliance. During a cleaning cycle, the electromagnetic environment inside the household appliance is not optimized for wireless communications with devices located outside of the household appliance. Wireless communication with other devices inside the household appliance such as sensors is also subject to interferences with surrounding electronic equipment of the household appliance. Further obstacles can be found in the cleaning process itself, such as the addition of water and detergents, the switching on of mechanical parts, the rotation of the drum or spray arms, which can all affect the ability to transmit wireless signals efficiently.

The present disclosure overcomes these challenges with a method for controlling the cleaning cycle of a household appliance remotely using wireless signals transmitted between a mobile dispensing device in the housing of the household appliance and an external electronic device.

Figure 1:
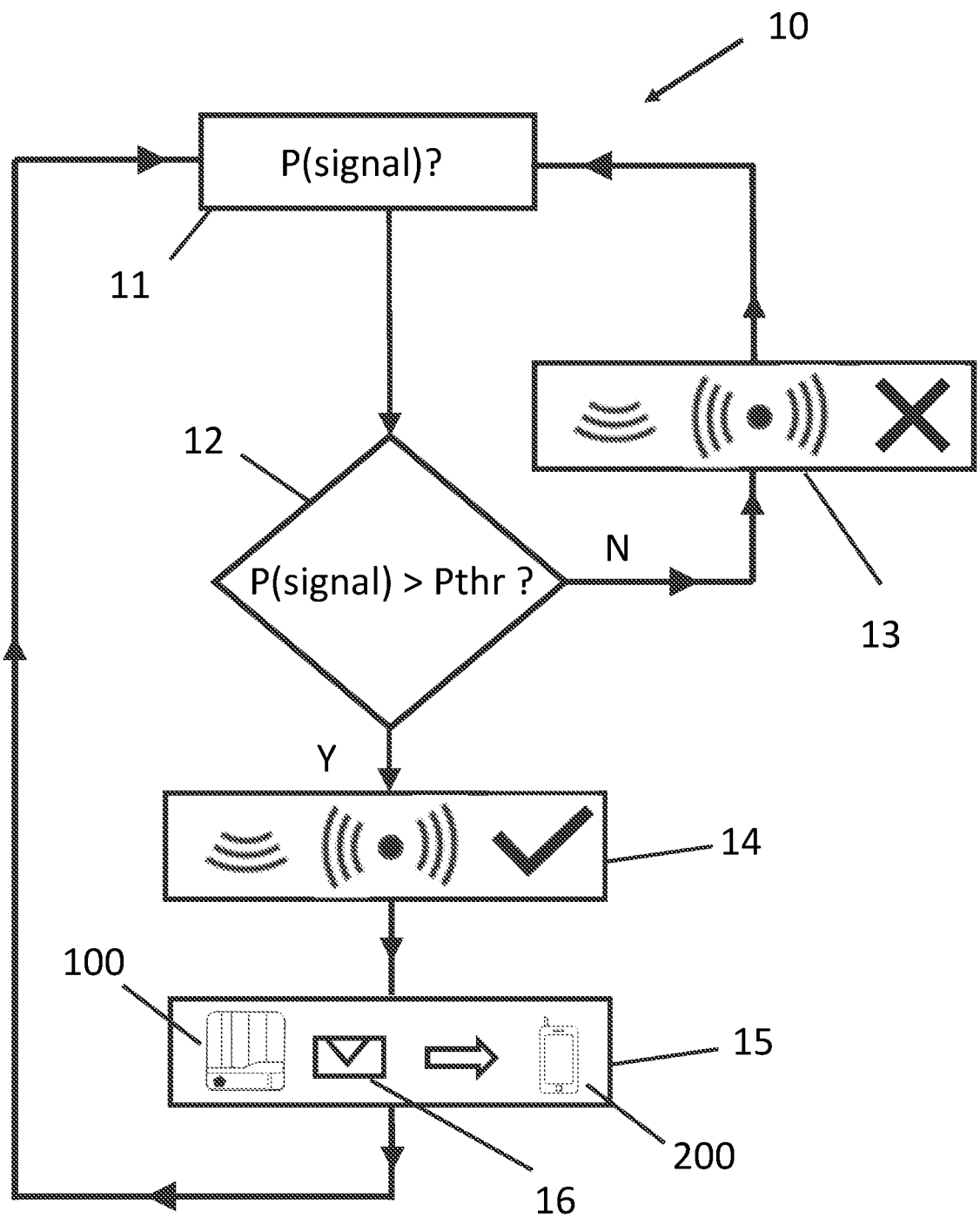
FIG. 1 shows a simplified workflow of a method according to an exemplary embodiment.

FIG. 1 illustrates schematically the steps occurring during this method 10.

Instead of transmitting signals continuously between the mobile dispensing device 100 and the external electronic device 200, the present disclosure sets criteria on the value of the strength of a wireless signal received by the mobile dispensing device 100 in order to enable or disable communication between the mobile dispensing device 100 and the external electronic device 200.

First, the method comprises determining 11 a value P (value) of a strength of a wireless signal received by the mobile dispensing device 100. Typically, in case of a direct communication between the external electronic device 200 and the mobile dispensing device 100, the wireless signal that is received comes from the external electronic device 200. It is also possible to implement this check of signal strength using a signal sent from an access node located either outside of the household appliance or anywhere in the household appliance, but not on the mobile dispensing device 100. This alternative is more appropriate in particular in case of an indirect communication between the mobile dispensing device 100 and the external electronic device 200.

The signal strength is determined either by measuring the value P (value) of the power of the electromagnetic signal that is received at a receiver of the mobile dispensing device 100, or this signal strength is estimated based on knowledge of the current status of the cleaning cycle, achieved for example using data provided by sensors. This estimation of the signal strength can also occur by accessing previous recordings of signal strengths in similar phases of the cleaning cycle. A database of such recordings can therefore advantageously be stored and accessed by the mobile dispensing device 100.

Signal strength is typically provided as a measurement of signal power over frequency bands used by wireless communications of the mobile dispensing device 100.

The method proceeds by comparing 12 the determined value of the strength of the wireless signal to a threshold signal strength value Pthr.

If the determined value is below the threshold value, transmission of wireless signals from the mobile dispensing device 100 to the external electronic device 200 is disabled 13. If the determined value is above the threshold value, transmission of wireless signals from the mobile dispensing device 100 to the external electronic device 200 is enabled 14.

It is to be noted that the enabled and disabled state of the communication between the mobile dispensing device 100 and the external electronic device 200 can be either one-sided or two-sided.

In one first embodiment, the external electronic device 200 can always send data to the mobile dispensing device 100, even if the opposite route is not allowed. In another second embodiment, the mobile dispensing device 100 disables also the reception of wireless signals from the external electronic device 200. The first and second embodiments can be used alternatively or jointly, in particular if the mobile dispensing device 100 establishes communication with more than one external electronic device 200.

In the event that all communications between the mobile dispensing device 100 and the external electronic device 200 are disabled, further determination of the value of the strength of a wireless signal received by the mobile dispensing device 100 can be done either by making estimations as explained above, or can be done using signals received from an access node.

As seen further seen on FIG. 1, after a transmission of wireless signals has been disabled or enabled, a further determination of the value of the strength of a wireless signal P(signal) can be started again and that value is compared again to the threshold value.

It is to be noted that the threshold value can be changed over time, for example if it is observed that transmission of wireless signals remains disabled for a long period of time, such as for example more than 15 minutes or more than half an hour or more than 1 hour.

Typical values for signal strength threshold values are expressed as attenuations of a signal in Decibels. Since signal strength is generally also correlated to the speed of transmission of data, it is advantageous to set the threshold value at a value below which the speed of data transmission significantly drops. A significant drop can for example be a drop of more than half the previous speed of data transmission. Another physical criterion that can be used to set the threshold value is the consumption of battery on the mobile dispensing device 100 that arises from enabling a wireless signal transmission. A value of attenuation above which consumption of battery power increases by more than 20% can be set as a criterion.

Typical values for the threshold value can be set at −65 dBm, −45 dBm, −35 dBm or −75 dBm.

Upon enabling transmission of wireless signals from the mobile dispensing device 100 to the external electronic device 200, the mobile dispensing device 100 sends a status wireless signal comprising status information about the cleaning cycle. This information can for example comprise the time left until completion of the cleaning cycle, parameters such as current temperature in the housing of the household appliance, the amount of detergent that has been dispensed or is planned to be dispensed into the housing, the name of the current phase of the cleaning cycle and possible recommendations for authorizing changes to the current cleaning cycle.

The sending of a status wireless signal can occur more than once during the cleaning cycle as the determination of the signal strength and the comparison to the threshold value advantageously occurs repeatedly as seen on the flowchart of FIG. 1.

The frequency of these repetitions can vary. It can occur continuously, or every 10 seconds, every minute, every 2 minutes, every 5 minutes, every 10 minutes, every fifteen minutes.

It can for example be done by measuring the RSSI (Received Signal Strength Indicator) value, in particular in the event that the signal is received from an access node of a network. It can also be done by measuring the amplitude of the electrical current generated in the mobile dispensing device by the reception of the signal or the amplitude of the electromagnetic radiation received by an antenna of the mobile dispensing device.

Triggering of a measurement of the signal strength can also occur based on the value of the previous signal strength that was measured. For example, if the last value or the two to ten values that were measured were all representative of a strong signal which enables fast data transmission with low loss of battery power, then the next measurement of signal strength can occur at least one to ten minutes later. If a drop in signal strength is observed during a wireless transmission of signals between the mobile dispensing device and the external electronic device, then the measurement of signal strength can occur more frequently, at least from once per minute to once every five minutes. It is possible to apply a different logic to the timing of measurements of signal strength, in particular the opposite logic according to which the frequency of the measurement is higher when signal strength is high, and the frequency of the measurement is lower when signal strength is low.

Figure 2:
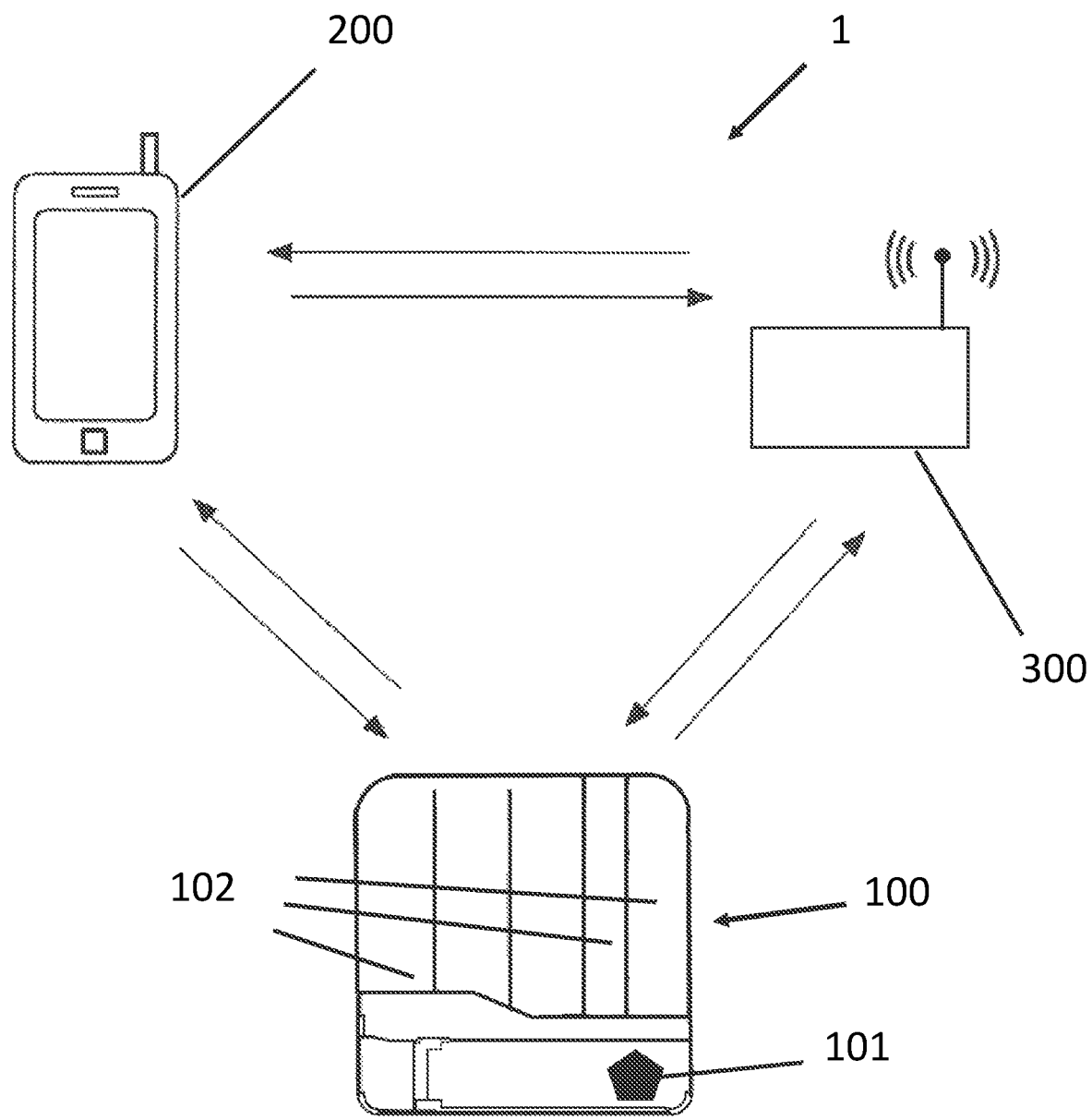
FIG. 2 is a schematic representation of a system comprising a mobile dispensing device and an external electronic device according to an embodiment.

FIG. 2 shows a system 1 capable of implementing the method described above. It comprises in particular a mobile dispensing device 100, comprising more than one cartridge 102 clipped on a base comprising dispensing valves. A data processing unit 101 advantageously enables reception and emission of radio signals to establish a communication with at least one other device, outside of the household appliance in which the mobile dispensing device 100 is placed during a cleaning cycle. The external electronic device 200 can be any device capable of sending and receiving signals such as a mobile phone, a tablet, a smart watch, a computer or server for example. Instead of a direct connection with the mobile dispensing device 200, the mobile dispensing device can also exchange data with an access node 300. Such a device is part of a wireless network, and its position can be closer to the household appliance or advantageously placed so that it enables a better exchange of information with electronic devices outside of a household appliance. The access node 300 typically acts as a relay of wireless transmission between the mobile dispensing device 100 and the external electronic device 200.

Figure 3:
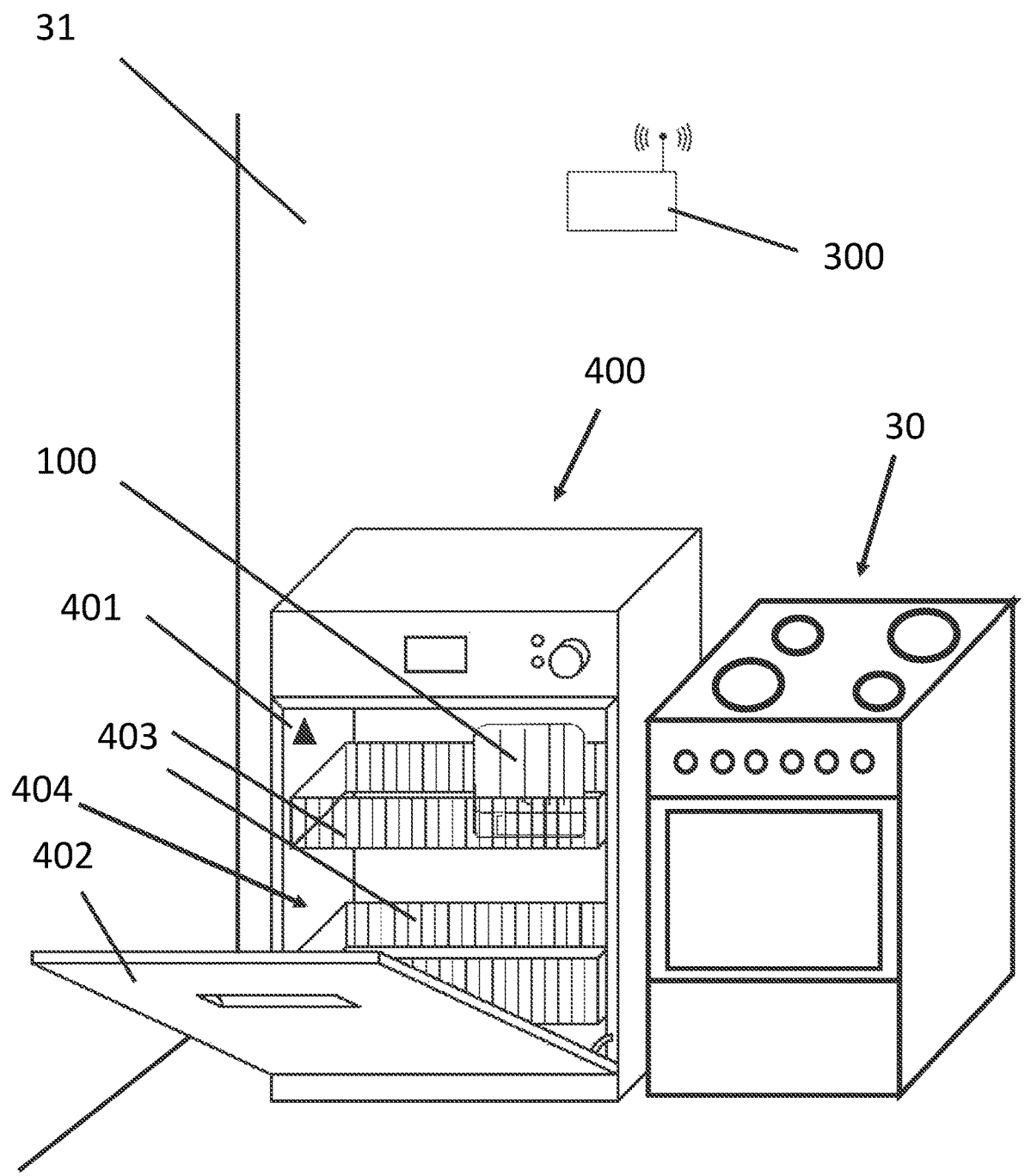
FIG. 3 is a schematic representation of a household appliance comprising a mobile dispensing device in a housing of the appliance in a room.

FIG. 3 illustrates one possible arrangement of a mobile dispensing device 100 inside a household appliance 400. In the example of FIG. 3, the household appliance is a dishwasher, but other mobile dispensing devices, in particular circular-shaped dispensing devices adapted to dispense detergents and/or fragrances during a cleaning cycle in a washing machine can also be used.

The dishwasher of FIG. 3 comprises two trays 403, a housing 404 in which the trays and the mobile dispensing device 100 are placed, a door 402 and its own electronics to control the cleaning cycle by setting parameters such as temperature, duration of the different wash and rinse cycles for example.

The environment in which the household appliance 400 is placed can comprise other obstacles and sources of electromagnetic interference such as other appliances 30, shielding from walls 31 or any other obstacle to a fast and efficient transmission of wireless signals such as other wireless transmissions or a location in a closed room in a basement.

During the cleaning cycle, the door 402 of the household appliance is closed which reduces the strength of the signal that the mobile dispensing device 100 can receive from the external electronic device 200, or a node 300. Measuring patterns in the changes of the signal strength allows identification of the presence of possible interferences in the environment of the mobile dispensing device, or identification of its location in a non-optimal place in the housing 404.

Based on previous recordings of variations of the strength of the wireless signal received by the mobile dispensing device 100, it is possible to identify a lower than usual signal strength and recommend a change in the position of sources of interference around the household appliance 400 or a change in the position of the mobile dispensing device 100 in the household appliance 400, for example placing it on another tray or in a different position on the same tray.

A change in the position of the node 300 that sends wireless signals to the mobile dispensing device 100 is another possible recommendation that can be output by the mobile dispensing device 100.

Another recommendation can include for example the switching off of an electronic device in the vicinity of the household appliance 400, or installation of a signal amplifier to improve the efficiency of the transmission of data during the cleaning cycle.

Some of the information received by the mobile dispensing device 100 from the external electronic device 200 can comprise information provided by a user. Such information can for example include information regarding the presence of other appliances in the room in which the household appliance 400 is located, a distance from the user and the household appliance or a selection of a cleaning result that a user wishes to achieve for the current cleaning cycle. Input of a desired cleaning result can for example occur by selecting an intensity of a cleaning cycle: economical, using little detergent; standard, seeking a compromise between intensity of the cleaning cycle and saving of resources; and intense, maximizing cleaning performance regardless of energy or detergent savings.

During the cleaning cycle, reception of new instructions from the external electronic device 200 can lead to a change of the program run by the mobile dispensing device 100 in the cleaning cycle. For example, if a user provides new instructions or if it is determined that a different strategy for dispensing cleaning agents is more advantageous than the one currently being run by the mobile dispensing device 100, an update of the program to dispense cleaning agents included in the mobile dispensing device 100 can occur.

According to an advantageous embodiment, the cleaning cycle can run according to a prerecorded and selected program if the mobile dispensing device 100 does not receive any instruction from a node 300 or an external electronic device 200. Modifications to the program are then only possible if internal sensors provide information on the status of the current cleaning cycle.

If the value of the strength of wireless signals between the mobile dispensing device 100 and the node 300 and/or the external electronic device 200 allows a transmission of wireless signals, the mobile dispensing device 100 may accept to receive instructions from the external electronic device or take information provided to it by external sources of information in order to update the current dispensing strategy during the cleaning cycle.

If the transmission of information is interrupted during the cleaning cycle, the mobile dispensing device 100 continues to apply a current dispensing strategy.

As seen on FIG. 3, the household appliance 400 can also comprise internal electronic devices 401 such as sensors, arranged either in the housing 404 or anywhere else on or in the household appliance. These sensors can measure some current parameters of the cleaning cycle such as turbidity of the wash water, conductivity of the wash water, temperature of the wash water or the air in the housing, time left until the end of the cleaning cycle or time already lapsed during the cleaning cycle. These measurements are used by the household appliance 400, but the mobile dispensing device 100 may also establish a communication either with the sensor or with the household appliance 400 in order to obtain this information.

According to an advantageous embodiment, the measurement of changes in the strength of the wireless signal received by the mobile dispensing device 100 can be used to determine the current phase of the cleaning cycle that is run. Indeed, wash cycles, rinse cycles, as well as vibration patterns characteristic of each program run by appliances all can influence the value of the strength of the signal. This can be used to determine or confirm the current status of the cleaning cycle when generating a report for the external electronic device 200.

If the transmission of wireless signals is interrupted during the cleaning cycle because the value of the strength of the wireless signal drops below the threshold value, the conditions under which this occurs can be recorded in order to generate a report for the user. The conditions could in particular include the time lapsed since the beginning of the cleaning cycle, the temperature, the value of the signal strength, the duration during which the value of the signal strength was below the threshold value.

This can be used to make further recommendations to the user regarding placement of a node amplifier or placement of the mobile dispensing device 100 in the housing 404 of the household appliance 400.

For signal strength values above the threshold value, it is possible to define different ranges for signal strength values with specific allowances in terms of amount of data that can be transmitted. In wireless signal transmission, lower signal strengths are correlated with lower rates of data transmission. In order to avoid using too much battery power, full transmission of status information is allowed only if the signal strength is within the highest strength values. These signals strengths typically correspond to attenuations ranged between 0 dBm and −65 dBm or down to −75 dBm.

For lower signal strengths typically between −80 dBm and −65 dBm or −75 dBm of attenuation, only essential information is transmitted (for example: time left until completion).

Table 1 displayed below shows different possible signal strength value ranges that can be defined, the higher the signal strength attenuation, the smaller the total amount of data that is allowed to be transmitted.

| RSSI/attenuation | | Signal strength |
| --- | --- | --- |
| From 0 dB to −65 dBm | ++ | Very stable |
| From −65 dBm to −75 dBm | + | Stable |
| From −75 dBm to −80 dBm | +/− | Not very stable |
| From −80 dBm to −90 dBm | − | Unstable |
| Below −90 dBm | − − | Very unstable |

It is to be further noted that, although all the above examples only describe situations in which the mobile dispensing device 100 exchanges information with a node 300 and/or an external electronic device 200, the mobile dispensing device 100 may also be capable of exchanging (receiving and/or transmitting) information with the household appliance 400. This exchange of information can in particular include access to the cleaning program that is run by the household appliance, parameters measured by the household appliance 400 on the current status of the cleaning cycle. The mobile dispensing device 100 may also be allowed to instruct the household appliance 400 to change parameters in order to support a dispensing strategy that it considers to be more appropriate than the one currently being run by the appliance.

The steps of the examples and embodiments described above can be implemented by a processor such as a computer. A computer program product comprising steps of the above-described method can be used to implement the method on a computer.

It is possible to store a computer program comprising instructions to implement the method of the present disclosure on different non-transitory computer readable storage mediums. These could for example comprise a processor or chip, FPGA (field programmable gate array), an electronic circuit comprising several processors or chips, a hard drive, a flash or SD card, a USB stick, a CD-ROM or DVD-ROM or Blue-Ray disc, or a diskette.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

Examples

In the following examples, a mobile dispensing device 100 with radio frequency connectivity is positioned in various household dishwashers.

Measurements were performed using an Apple® SE smartphone as an access point to a network and an application for measuring signal strength and data transmission performance (WiFi Signal Strength Meter App). The mobile dispensing device 100 has a communication unit based on a Qualcomm® QCA4010 chip and operates on the 2.4 GHz band in accordance with the IEEE 802-.11 standard. The theoretical range of the system indoors can be 70 m.

In open air, when the measuring device is placed 30 cm away from the mobile dispensing device, an attenuation of −25 dBm is measured in all directions. This attenuation is mainly caused by the mobile dispensing device and the casing of the measuring device themselves. This serves as a reference value for the following measurements.

With the mobile dispensing device in a fixed position in the dishwasher, the following measuring points are defined:

A: dishwasher door open, tray out.
B: dishwasher door open, tray pushed in.
C: door closed, tray pushed in.
D: 4 m distance, clear view of the dishwasher, 1 table in the transmission path.
E: 8 m distance, 1 wall (gypsum plasterboard frames planked on both sides 13 cm thick).
F: 10 m distance, 2 walls (2× gypsum plasterboard frames planked on both sides 13 cm thick).
G: 1 floor distance, 1 reinforced concrete ceiling 30 cm thick.
H: 2 floors distance, 2 reinforced concrete ceilings 30 cm thick.

Example 1: Mobile Dispensing Device 100 Placed in a Bosch® SHE 8PT55UC (US Model)

TABLE 2

| Measurement point | Attenuation (dBm) | Data transmission rate (Mbps) |
|---|---|---|
| A | −35 | 54 |
| B | −35 | 54 |
| C | −46 | 54 |
| D | −70 | 16 |
| E | −80 | 16 |
| F | −84 | 5 |
| G | −89 | 5 |
| H | −92 | 5 | attenuation measured at different measuring points as defined above

As can be seen from the above measurements, it makes sense to define a threshold signal strength value at about −80 dBm of signal strength attenuation and allow full transmission of data only for signal strengths above −46 dBm of attenuation.

Example 2: Mobile Dispensing Device 100 Placed in a Miele® GS6820SC (EU Model)

TABLE 3

| Measurement point | Attenuation (dBm) | Data transmission rate (Mbps) |
|---|---|---|
| A | −30 | 54 |
| B | −29 | 54 |
| C | −53 | 54 |
| D | −66 | 54 |
| E | −79 | 16 |
| F | −89 | 5 |
| G | −89 | 5 |
| H | — | — | attenuation measured at different measuring points as defined above

In this second example, the signal strength threshold value can typically be set at −79 dBm of attenuation, and full transmission of data can be allowed for signals having a signal strength above −66 dBm of attenuation.

Example 3: Mobile Dispensing Device 100 Placed in a AEG® F56302WO (EU Model)

TABLE 4

| Measurement point | Attenuation (dBm) | Data transmission rate (Mbps) |
|---|---|---|
| A | −44 | 54 |
| B | −41 | 54 |
| C | −45 | 54 |
| D | −64 | 54 |
| E | −73 | 21 |
| F | −89 | 5 |
| G | −92 | 5 |
| H | — | — | attenuation measured at different measuring points as defined above

In this third example, the signal strength threshold value can typically be set at −73 dBm of attenuation, and full transmission of data can be allowed for signals having a signal strength above −64 dBm of attenuation.

Example 4: Mobile Dispensing Device 100 Placed in a Neff® S52M65X4 (EU Model, Installed in a Kitchenette)

With the mobile dispensing device in a fixed position in the dishwasher, the following measuring points are defined:
A: dishwasher door open, tray out.
B: dishwasher door open, tray pushed in.
C: door closed, tray pushed in.
D: 4 m distance, clear view of the dishwasher, 1 cupboard 90 cm high in the transmission path.
E: 2 m distance, 1 wall (gypsum plasterboard frames planked on both sides 13 cm thick).
F: 9 m distance, basement 1 reinforced concrete ceiling 25 cm thick).
G: 2 m distance, basement (under dishwasher, 1 reinforced concrete ceiling 20 cm thick).
H: 9 m distance, 1 floor (1×reinforced concrete slabs 20 cm thick).
I: 3 m distance, 1 floor (above dishwasher, 1 reinforced concrete ceiling 20 cm thick).

| Measurement point | Attenuation (dBm) | Data transmission rate (Mbps) |
| --- | --- | --- |
| A | −42 | 54 |
| B | −45 | 54 |
| C | −56 | 54 |
| D | −75 | 54 |
| E | −71 | 21 |
| F | −91 | 5 |
| G | −69 | 21 |
| H | −90 | 5 |
| I | −80 | 21 |

In this fourth example, it can be seen that distance to the mobile dispending device 100 can be an important criterion for signal strength. A threshold value around −75 dBm could be advantageously defined.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for remotely controlling a cleaning cycle of a household appliance using transmission of wireless signals, the wireless signals being transmitted between a mobile dispensing device configured to be arranged in a housing of the household appliance and an external electronic device located outside of the household appliance, the method comprising:
determining a value of a strength of a wireless signal received by the mobile dispensing device;
comparing the determined value of the strength of the wireless signal received by the mobile dispensing device to a threshold signal strength value;
enabling transmission of wireless signals from the mobile dispensing device to the external electronic device when the determined value of the strength of the wireless signal received by the mobile dispensing device is above the threshold signal strength value;
sending a status wireless signal comprising status information about the cleaning cycle, the status wireless signal being sent from the mobile dispensing device to the external electronic device when transmission of wireless signals is enabled during the cleaning cycle; and
disabling transmission of wireless signals from the mobile dispensing device to the external electronic device when the determined value of the strength of the wireless signal received by the mobile dispensing device is below the threshold signal strength value.

2. The method according claim 1, wherein the value of the strength of the wireless signal is determined by repeatedly obtaining a value of an attenuation of signals received by the mobile dispensing device.

3. The method according to claim 1, further comprising:
determining a change in the value of the strength of the wireless signal received by the mobile dispensing device over time;
determining a status of the cleaning cycle run by the household appliance based on the determined change.

4. The method according to claim 1, further comprising:
determining a pattern in values of the strength of the wireless signal received by the mobile dispensing device as a function time; and
identifying contributions to the determined pattern external to the cleaning cycle run by the household appliance.

5. The method according to claim 4, wherein the identification of contributions to the determined pattern external to the cleaning cycle run by the household appliance is implemented using one among:
comparison of the determined pattern to patterns stored from previous cleaning cycles run by the household appliance; and
input from a user.

6. The method according to claim 4, further comprising:
recording determined values of the strength of the wireless signal received by the mobile dispensing device; and
generating a report for the external electronic device if the recorded values comprise at least one value that is below the signal strength threshold value.

7. The method according to claim 4, further comprising:
outputting a recommendation for one among:
a change in a position of the mobile dispensing device inside the household appliance;
a change in a position of a source of wireless signal interferences;
a switching off of the source of wireless signal interferences;
installation of a signal amplifier; and
a change in the position of an access node used to relay information from the mobile dispensing device to the external electronic device.

8. The method according to claim 1, further comprising:
modifying a program to dispense cleaning agents from the mobile dispensing device into the housing during the cleaning cycle based on information provided in wireless signals received by the mobile dispensing device, the cleaning agents being contained in the mobile dispensing device; and dispensing the cleaning agents based on the modified program.

9. The method according to claim 1, wherein an internal electronic device capable of establishing a communication with the mobile dispensing device is located inside the household appliance, the method further comprising:

receiving, at the mobile dispensing device, an internal wireless signal from the internal electronic device providing information on a parameter of the cleaning cycle run by the household appliance; and determining a change to a program to dispense cleaning agents from the mobile dispensing device into the housing during the cleaning cycle based on the received internal wireless signal.

10. The method according to claim 1, further comprising:

sending an instruction to change a program to dispense cleaning agents from the mobile dispensing device into the housing, the instruction being sent as a wireless signal from the external electronic device to the mobile dispensing device during the cleaning cycle.

11. The method according to claim 1, further comprising:

defining at least two wireless signal strength value ranges for signal strength values above the threshold value, the two wireless signal strength value ranges comprising a first signal strength value range and a second signal strength value range, values of strengths of signals belonging to the first signal strength value range being higher than values of strengths of signals belonging to the second signal strength value range;

allowing unrestricted transmission of data upon determining that the strength of the wireless signal received by the mobile dispensing device belongs to the first signal strength value range; and restricting an amount of data that is transmitted upon determining that the strength of the wireless signal received by the mobile dispensing device belongs to the second signal strength value range.

12. The method according to claim 1, wherein the wireless signal received by the mobile dispensing device is sent form an access node.

13. The method according to claim 12, wherein the access node is part of one among: the external electronic device and a wireless communication node part of a wireless network.

14. A system for remotely controlling a cleaning cycle of a household appliance, the system comprising:

a mobile dispensing device configured to be arranged in a housing of the household appliance;

an external electronic device located outside of the household appliance; and at least one data processing device arranged in the mobile dispensing device and configured to:

determine a value of a strength of a wireless signal received by the mobile dispensing device;

compare the determined value of the strength of the wireless signal received by the mobile dispensing device to a threshold signal strength value;

enable transmission of wireless signals from the mobile dispensing device to the external electronic device when the determined value of the strength of the wireless signal received by the mobile dispensing device is above the threshold signal strength value;

send a status wireless signal comprising status information about the cleaning cycle, the status wireless signal being sent from the mobile dispensing device to the external electronic device when transmission of wireless signals is enabled during the cleaning cycle; and disable transmission of wireless signals from the mobile dispensing device to the external electronic device when the determined value of the strength of the wireless signal received by the mobile dispensing device is below the threshold signal strength value.

15. A non-transitory computer program product comprising instructions for executing a method for remotely controlling a cleaning cycle of a household appliance using transmission of wireless signals, the wireless signals being transmitted between a mobile dispensing device configured to be arranged in a housing of the household appliance and an external electronic device, the method comprising:

determining a value of a strength of a wireless signal received by the mobile dispensing device;

comparing the determined value of the strength of the wireless signal received by the mobile dispensing device to a threshold signal strength value;

enabling transmission of wireless signals from the mobile dispensing device to the external electronic device when the determined value of the strength of the wireless signal received by the mobile dispensing device is above the threshold signal strength value;

triggering emission of a status wireless signal comprising status information about the cleaning cycle, the status wireless signal being sent from the mobile dispensing device to the external electronic device when transmission of wireless signals is enabled during the cleaning cycle; and disabling transmission of wireless signals from the mobile dispensing device to the external electronic device when the determined value of the strength of the wireless signal received by the mobile dispensing device is below the threshold signal strength value.

* * * * *